US010743706B2

(12) United States Patent
Abegglen et al.

(10) Patent No.: US 10,743,706 B2
(45) Date of Patent: *Aug. 18, 2020

(54) CAPSULE AND SYSTEM FOR PREPARING A BEVERAGE BY CENTRIFUGATION IN A BEVERAGE PRODUCTION DEVICE

(71) Applicant: NESTEC S.A., Vevey (CH)

(72) Inventors: Daniel Abegglen, Rances (CH); Alexandre Perentes, Lausanne (CH); Carlo Magri, Monthey (CH); Arnaud Gerbaulet, Oye et Pallet (FR)

(73) Assignee: Societe des Produits Nestle S.A., Vevey (CH)

( * ) Notice: Subject to any disclaimer, the term of this patent is extended or adjusted under 35 U.S.C. 154(b) by 19 days.

This patent is subject to a terminal disclaimer.

(21) Appl. No.: 15/623,837

(22) Filed: Jun. 15, 2017

(65) Prior Publication Data
US 2017/0280917 A1 Oct. 5, 2017

Related U.S. Application Data

(62) Division of application No. 13/575,923, filed as application No. PCT/EP2011/051244 on Jan. 28, 2011, now abandoned.

(30) Foreign Application Priority Data

Jan. 29, 2010 (EP) .................................... 10152158

(51) Int. Cl.
A47J 31/22 (2006.01)
B65D 85/804 (2006.01)
(Continued)

(52) U.S. Cl.
CPC .............. A47J 31/22 (2013.01); A23F 5/262 (2013.01); A47J 31/369 (2013.01);
(Continued)

(58) Field of Classification Search
CPC .. B65D 85/8043; B65D 85/8046; A47J 31/22; A47J 31/44; A47J 31/4403;
(Continued)

(56) References Cited

U.S. PATENT DOCUMENTS 5,104,666 A 4/1992 Sanvitale
5,402,707 A 4/1995 Fond et al.
(Continued)

FOREIGN PATENT DOCUMENTS

CA 2046558 1/1992
EP 0651963 5/1995
(Continued)

OTHER PUBLICATIONS

Coffe Forums NPL, response published Feb. 9, 2006, http://www.coffeeforums.com/forum/coffee-drinks/2733-how-much-grounds-used-make-expresso.html.
(Continued)

Primary Examiner — Bryan Kim
(74) Attorney, Agent, or Firm — K&L Gates LLP

(57) ABSTRACT

A capsule is designed for insertion in a centrifugal beverage production device for preparing a beverage from a substance contained in the capsule by introducing liquid in the capsule and passing the liquid through the substance using centrifugal forces. The capsule includes a body having a bottom end and an open end spaced apart in the axial direction, an upper wall for covering the body at the open end along a direction transverse to the axial direction, and an enclosure between the body and the upper wall containing a predetermined amount of beverage substance. The capsule further includes an annular pressure-setting ring configured for adjusting the backpressure in the beverage production device. The pressure-setting ring provides an improved coffee in-cup quality. A set of capsules can have pressure-setting rings of different (Continued)

dimensions for setting different backpressure when engaged in a centrifuging beverage production device.

18 Claims, 9 Drawing Sheets

(51) Int. Cl.
  *A47J 31/36* (2006.01)
  *A23F 5/26* (2006.01)
(52) U.S. Cl.
  CPC ...... *A47J 31/3676* (2013.01); *B65D 85/8043* (2013.01); *A47J 31/3695* (2013.01)
(58) Field of Classification Search
  CPC ........ A47J 31/4482; A47J 31/24; A47J 31/30; A47J 31/32; A47J 31/34; A47J 31/36; A47J 31/3676; A47J 31/369; A47J 31/3695; A47J 31/407; A23F 5/262
  USPC ............ 426/106, 112, 115, 432–435; 99/295
  See application file for complete search history.

(56) References Cited

U.S. PATENT DOCUMENTS

| | | | | |
|---|---|---|---|---|
| 7,469,627 | B2 * | 12/2008 | Li | A47J 31/22 99/286 |
| 8,176,714 | B2 * | 5/2012 | Abegglen | B29C 45/045 53/452 |
| 8,409,646 | B2 * | 4/2013 | Yoakim | A47J 31/0642 426/115 |
| 8,431,175 | B2 * | 4/2013 | Yoakim | A47J 31/22 426/431 |
| 8,658,232 | B2 * | 2/2014 | Yoakim | A47J 31/22 426/431 |
| 8,916,215 | B2 | 12/2014 | Yoakim et al. | |
| 8,919,242 | B2 * | 12/2014 | Perentes | A47J 31/22 426/425 |
| 8,978,545 | B2 * | 3/2015 | Yoakim | A47J 31/22 99/289 R |
| 8,986,764 | B2 * | 3/2015 | Yoakim | A47J 31/22 426/115 |
| 9,072,402 | B2 | 7/2015 | Ryser | |
| 9,102,464 | B2 * | 8/2015 | Simanski | B65D 85/8043 |
| 9,399,546 | B2 * | 7/2016 | Abegglen | B65D 85/8043 |
| 9,415,931 | B2 * | 8/2016 | Gerbaulet | A47J 31/22 |
| 9,545,121 | B2 * | 1/2017 | Perentes | A47J 31/22 |
| 9,592,953 | B2 * | 3/2017 | Gerbaulet | A47J 31/22 |
| 9,694,969 | B2 * | 7/2017 | Abegglen | A47J 31/22 |
| 2007/0068395 | A1 | 3/2007 | Masek et al. | |
| 2009/0320692 | A1 | 12/2009 | Simanski | |
| 2011/0003038 | A1 | 1/2011 | Colantonio et al. | |
| 2011/0259204 | A1 | 10/2011 | Kaeser | |

FOREIGN PATENT DOCUMENTS

| | | | |
|---|---|---|---|
| EP | 1654966 | 5/2006 | |
| EP | 1849715 | 7/2009 | |
| FR | 2041380 | 1/1971 | |
| FR | 2487661 | 2/1982 | |
| WO | 2006112691 | 10/2006 | |
| WO | 2007137974 | 12/2007 | |
| WO | 2008148604 | 12/2008 | |
| WO | 2008148646 | 12/2008 | |
| WO | WO-2008148650 A1 * | 12/2008 | .......... A47J 31/0642 |
| WO | WO-2008148834 A1 * | 12/2008 | ............. A47J 31/22 |
| WO | 2009106598 | 9/2009 | |
| WO | 2010066705 | 6/2010 | |

OTHER PUBLICATIONS

How Stuff Works NPL, Published Apr. 4, 2003 http://web.archinve.org/web/20030404175106/http://home.howstuffworks.com/question645.html.
Expresso NPL, Published Mar. 4, 2001, http://web.archive.org/web/20010304042249/http://www.coffeeresearch.org/expresso/potential.html.
Coffee Detective NPL, Published Mar. 15, 2008, http://web.archive.org/web/2008031595453/http://www.coffedetective.com/flavored-k-cups.html.
International Search Report, PCT/EP2011/051244, dated Feb. 28, 2011.

* cited by examiner

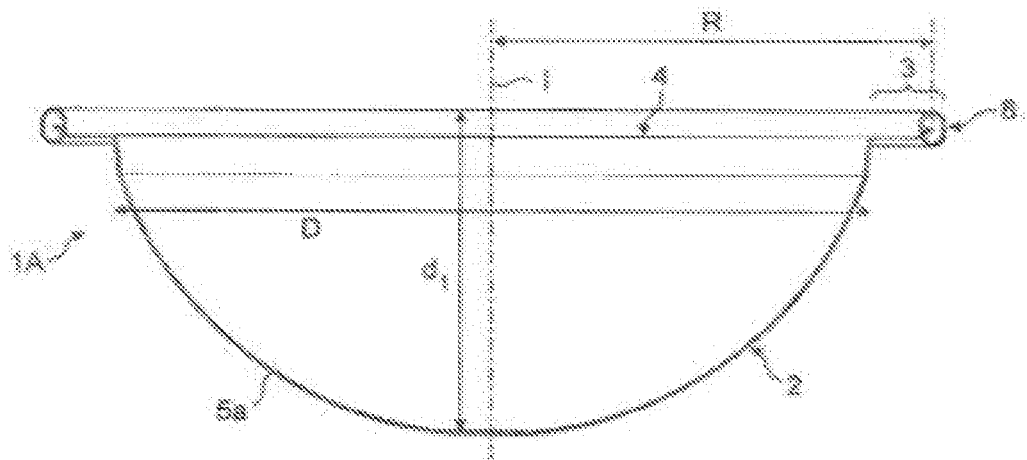

CAPSULE AND SYSTEM FOR PREPARING A BEVERAGE BY CENTRIFUGATION IN A BEVERAGE PRODUCTION DEVICE

PRIORITY CLAIM

This application is a divisional of U.S. application Ser. No. 13/575,923 filed Jul. 27, 2012, which is a National Stage of International Application No. PCT/EP11/51244 filed Jan. 28, 2011, which claims priority to European Patent Application No. 10152158.1 filed Jan. 29, 2010, the entire contents of which are incorporated herein by reference.

FIELD OF THE INVENTION

The present invention relates to a capsule designed for preparation of a beverage by centrifugation, the use of a capsule in a beverage producing device and a capsule system combining a capsule and a beverage producing device for preparing a beverage from a beverage substance contained in the capsule and by passing a liquid fed by the device through the substance in the capsule using centrifugal forces.

In particular, the present invention relates to a capsule forming in conjunction with a beverage production device, a dedicated restriction valve, thereby constituting a pressure-setting means for the centrifuged liquid leaving the capsule.

BACKGROUND OF THE INVENTION

Systems exist for preparing beverages such as coffee by forcing a liquid through ingredients contained in the capsule using centrifugal forces.

WO 2008/148604 for example relates to a capsule for preparing a beverage or liquid food from a substance, in a centrifugal brewing unit, by passing water through the substance contained in the capsule by using brewing centrifugal forces comprising: an enclosure containing a predetermined dose of substance; opening means which opens under the centrifugal effect to allow the brewed liquid to leave the capsule. The capsule may also comprise means for engaging the capsule external rotational driving means of a centrifugal brewing device wherein the engaging means are configured to offer a resistance to torque during rotation of the capsule for maintaining the capsule in a reference rotational position.

Thereby, the effect of centrifugal forces to brew coffee or prepare other food substances presents many advantages compared to the normal brewing methods using pressure pumps. For example, in traditional espresso or lungo coffee type brewing methods using a pressure pump, it is very difficult to master all the parameters which influence the quality of extraction of delivered coffee extract. These parameters are typically the pressure, the flow rate which decreases with the pressure, the compaction of the coffee powder which also influences the flow characteristics and which depends on the coffee ground particle size, the temperature, the water flow distribution and so on. Therefore, it is not easy to vary the extraction pressure and flow rates because there are essentially determined by the resistance of the bed of coffee and the downstream filtering system.

For a centrifugal extraction, the quality of the beverage to be prepared (intensity or strength, taste, aroma, foam/crema, etc.) is complex and depends on the control of different brewing parameters and capsule design. In particular, the flow rate of the injected liquid in the capsule seems to play an important role. The flow rate can be influenced by a number of parameters such as the rotational speed of the capsule in the device, the fluid dynamics inside the capsule, the back-pressure exerted on the centrifuged liquid. For instance, for a given back-pressure, the higher the rotational speed, the larger the flow rate. Conversely, for a given rotational speed, the larger the back-pressure, the smaller the flow.

Whereas the rotational speed of the capsule is usually controlled by control means selectively activating a rotational motor of a centrifugal beverage production device, a predefined back-pressure can be obtained by a flow restriction at the outlet of the capsule or at the outside of a centrifugal cell carrying the capsule.

For example EP 651 963 teaches that a pressure gradient is obtained by a rubber-elastic element interposed at the interface between the engagement lid and the cup of the centrifugal cell, e.g., a capsule containing coffee powder. Such an element deforms elastically to leave a filtering passage for the liquid when a certain pressure is attained at the interface.

Furthermore, documents FR 2 487 661 and WO 2006/112691 relate to centrifugal systems wherein a fixed restriction is placed downstream of the filter to create a pressure gradient.

Moreover, WO 2008/148646 proposes a solution in which a flow restriction is placed in or outside the centrifugal cell. The flow restriction can comprise a regulating valve offering an effective pressure. The valve opens under the effect of pressure. The more the valve opens, the higher the flow rate. The valve can be preloaded by a resilient element (rubber or spring). The higher the preload, the higher the opening pressure of for the centrifuged liquid upstream of the valve.

EP1654966A1 relates to a capsule with sealing means comprising a base body with a flange-like rim and a foil member closing the body. Such capsule is not designed for being used in a centrifugal preparation device.

The centrifugal beverage production systems of the prior art however suffer from the drawback that an adaptation of the back-pressure to predefined values either requires a mechanism that makes it complex to adjust to a large variety of different predefined values of the back-pressure.

Thereby, it is to be understood that in particular with respect to coffee beverages, the back-pressure applied on the centrifuged liquid determines the extraction conditions (e.g., flow rate) thereby influencing directly the coffee taste and aroma. Furthermore, the organoleptic texture such as the foam/crema formed on top of the prepared beverage highly also depends on the applied back-pressure. Thus, with respect to the foam/crema as well as the flow rate of a coffee beverage to be prepared, it is desired to adjust the values of the back-pressure dependent on the nature of the substance provided in a specific capsule as for different types of beverages a different quality and/or quantity of the foam/crema respectively a different flow rate is desired.

Therefore, there is a need for proposing, through a capsule system, coffee varieties with different tastes, intensities and/or types, e.g., ristretto, espresso, lungo, long coffee, etc., in particular, by which the back-pressure exerted on the centrifuged liquid at the interface between the capsule and the device can be better, more independently and conveniently controlled.

The term "back-pressure of the valve means" refers to the pressure loss created by the restriction or restriction valve. As the restriction or restriction valve forms a "bottleneck effect", a pressure of liquid is created upstream of it by the effect of the centrifugation. In particular, a pressure gradient is created wherein the pressure increases gradually from the axis of rotation towards the valve. Thanks to this restriction, the pressure before the restriction is increased, and it is this pressure which has an effect on the liquid-ingredient interaction (e.g. by extraction of the substance by the liquid). This pressure created by the restriction valve can also be defined as the ratio of force ("back-force") divided by the area of surface contact at the restriction valve.

Co-pending European patent application No. 08171069.1 (entitled: "Capsule for preparing a beverage by centrifugation in a beverage production device and device adapted therefore") proposes a capsule on which a force ring is provided that is engaged by a pressing surface of the beverage production device to form a valve means which provides, under the force of resilient means associated to the pressing surface, and depending on the height or thickness of the force ring, a certain back-pressure during beverage extraction.

It has now been found that the design of the force ring on the capsule impacts on the coffee in-cup quality, in particular, on the aroma content of the coffee extract.

One object of the present invention is propose a capsule designed for centrifugal extraction which further improves beverage in-cup quality in particular, coffee. The proposed solution is also easy to form, economical and can be reliably produced in mass production with a high respect of the dimensional tolerances.

In addition, the proposed solution enables to provide easily and economically different back-pressures in the device, for instance, to provide a wide range of beverages (e.g., coffee beverages). Furthermore, the proposed solution also allows the possible use of materials providing high gas barrier properties, e.g., aluminum, thereby avoiding the need for a costly overwrapping package.

The present invention provides a solution to the before-mentioned problems as well as offers additional benefits to the existing art.

OBJECT AND SUMMARY OF THE INVENTION

The present invention relates to a capsule designed for insertion in a beverage production device for preparing a beverage from a substance contained in the capsule by introducing liquid in the capsule and passing liquid through the substance using centrifugal forces, the capsule comprising:

a body comprising a bottom end and an open end, spaced apart in the axial direction, an upper wall for covering the body at its open end, along a direction transverse to the axial direction, an enclosure between the body and upper wall containing an amount of beverage substance, the capsule comprising a flange-like rim extending outwardly from the body, wherein the flange-like rim comprises an annular flange portion;

wherein the capsule comprises an annular pressure-setting ring configured for being engaged by a valve member of the beverage production device to provide a flow restriction valve for the centrifuged beverage flow leaving the capsule; wherein the annular pressure-setting ring extends transversally and axially beyond the flange-portion.

The pressure-setting ring is more particularly designed to adjust the backpressure formed by the valve means when inserted in the beverage production device.

More particularly, the annular pressure-setting ring extends, in the axial direction of the capsule, above the plane of the annular flange portion for being engaged by a valve member of a dedicated beverage production device and, extends, in the axial direction of the capsule, below the plane of the flange portion for being received in an annular lowered portion or recess of the capsule holder of the production device.

The annular pressure-setting ring (also called "force ring") forms in combination with a dedicated pressing surface of a valve member of the beverage production device, a restriction valve for the flow of beverage that comes out of the capsule during centrifugation. The pressure-setting ring is more particularly configured, together with the dedicated pressing surface of the device, to selectively block the flowpath of the centrifuged liquid in order to delay release of the liquid from the capsule and to set the liquid flow rate as a function of the speed of rotation. More particularly, when a sufficient pressure of the centrifuged liquid is reached at the valve means, i.e., the centrifuged liquid forcing against the pressure-setting ring, the valve means opens, i.e., a restricted flow gap is provided by a pressing surface of the device moving away from the pressure-setting ring of the capsule or vice versa. Before the pressure of the centrifuged liquid is attained, the valve means remains closed. Hence, the pressure-setting ring in engagement with the pressing surface blocks the flowpath for the centrifuged liquid. It should be noted that the opening of the valve means depends on the rotational speed of provided driving means which drive the capsule in rotation in the beverage production device. Therefore, as the valve means selectively blocks the flowpath for the centrifuged liquid, a preliminary wetting step of the beverage substance, e.g., ground coffee, can be carried out, as no liquid is yet discharged from the device. As a result of a prewetting and delayed release of the beverage, a thorough wetting of the substance is made possible and the interaction time between the liquid and the beverage substance, e.g., coffee powder, substantially increases and the extraction characteristics, e.g., coffee solid content and beverage yield, can be significantly improved.

More particularly, for a capsule of the invention, the annular pressure-setting ring of the capsule extends, in the axial direction of the capsule, above the plane of the annular flange portion, a longer distance than the distance it extends, in the axial direction of the capsule, below the plane of the flange portion.

In a mode, the annular pressure-setting ring of the capsule is hollow. More preferably, the pressure-setting ring is formed as an annular curl. By "curl" or "curled end", it is meant a portion of substantially rolled material, e.g., a rolled ply, forming a portion in relief at the free end of the flange-like rim of the capsule. The curl of material can be partially or fully rolled over. Rolling of the curl can be obtained by different techniques such as forming, embossing, deep-drawing, etc. More preferably, the curl is rolled over to form a substantially closed, hollow curl. Such characteristic provides the advantage to maintain a relatively light structure while providing a sufficient resistance to the deformation of the ring in axial direction when it is pressed by the valve member. Furthermore, it enables to use package materials in the form of a sheet such as by deep-drawing, pressing or forming.

In a particular mode, the annular pressure-setting ring forms an oval curl which longer dimension extends substantially in the axial direction. Such characteristic provides a higher resistance to the deformation of the ring without increasing the thickness of the material.

In another particular mode, the annular pressure-setting ring forms an oval curl which longer dimension extends substantially in the transversal direction.

However, in other modes of capsules, the annular pressure-setting ring forms a relatively round curl, in particular, when the distance of the annular pressure-setting ring above the plane of the annular flange portion of remains relatively short.

In particular, the annular pressure-setting ring can be made of plastic and/or metal. More preferably, it is made of aluminum or a multi-layer of aluminum and plastic, preferably aluminum-PP laminate (Polypropylene). "Aluminum" here encompasses any aluminum-based alloy or composite. Preferably, the pressure-setting ring is formed of a single piece with the flange portion and body of the capsule.

The capsule can be a closed capsule wherein the upper wall is a perforable membrane closing the body of the capsule. More preferably, the capsule is closed in a gastight manner to ensure a longer shelf life of the capsule. For this, the packaging material(s) will be chosen to provide gas barrier properties on all faces of the capsule. The capsule can moreover be filled with a gas protecting the substance against oxidation such as nitrogen or a mixture of carbon dioxide and nitrogen. In another possible mode, the capsule is not fully closed but comprises an upper wall with pores or apertures allowing liquid to be fed in and/or extracted out. The pores or apertures in the upper wall are preferably provided at the periphery of the upper wall. The pores or apertures are preferably distributed at the periphery along a substantially circular path and at a short distance from the flange portion, such as between 0.5 and 10 mm, preferably, between 1 and 8 mm.

In another mode, the annular pressure-setting ring is plain. By "plain", it is meant here that the pressure-setting ring is not hollow but filled with the same or a different material. The pressure-setting ring can, for instance, be provided as an increase of thickness of the flange-like rim protruding both above and below its flange plane. For example, the increase of material thickness forms a portion that is integral with the rest of the flange-like rim. In another example, the annular flange portion is made of flexible, film portion, onto which is sealed an annular portion of plain, solid material, e.g., hard plastic or rubber.

In a preferred mode, the ratio of the distance of the pressure-setting ring above the plane of the flange portion to the distance of the ring below the plane of the flange portion is comprised between 5:1 and 1:0.5. In particular, the distance above the plane of the flange portion is preferably comprised between 0.5 and 3 mm, preferably 0.8 and 2.5 mm. Moreover, the distance below the plane of the flange portion is preferably comprised between 0.1 and 2 mm, preferably 0.1 and 1 mm, most preferably 0.3 and 0.5 mm.

In a possible mode, the pressure-setting ring only extends axially above the plane of the flange portion of the rim but is free of any axial extension below said plane. In such a case, it is also preferred that the flange-like rim is deformable at least at the junction between the flange portion and the pressure-setting ring when a pressure of the valve member is applied onto the ring to ensure a proper fitting of the capsule in the device and correct setting of the back-pressure. For example, the deformability of the flange-like rim is obtained by at least one local portion of reduced thickness of the flange portion and/or by a sufficiently small thickness, e.g., such local portion or thickness being lower than 0.8 mm for plastic or other polymers and lower than 0.4 mm for aluminum.

Moreover, the capsule of the invention is specifically sized to provide, at the pressure-setting ring, sufficiently elevated centrifugal forces or pressures. For this, the radial distance from the central axis (I) of the capsule to pressure-setting ring. Most preferably such distance is comprised between 24 and 31 mm. More preferably, such distance is comprised between 25 and 30 mm. It was surprisingly found that above the upper limit, a significant loss of coffee aroma can be perceived irrespective of the rotational speed of the capsule in the device. Such loss is representative of less good coffee extraction conditions at such value. Below the lower limit, due to the lower centrifugal forces exerted on the force ring, the flow rate becomes too low and the extraction conditions are also impacted. Therefore, a radius above the given lower limit enables to maintain relatively moderate rotational speeds while maintaining sufficient pressure and flow rate at the force ring. Furthermore, a shorter radius would require an increase of the depth of the capsule to maintain a size of capsule enabling the same amount of coffee powder to be stored. This would likely lead to a lower homogeneity of extraction with areas of coffee powder less wetted than others. As will be further described, the radius is here measured as the distance from the central axis of the capsule to the top point of the force ring representing the distance (hereafter referred hi) of the pressure-setting ring above the plane (hereafter referred P) of the flange portion of the rim.

The present invention further relates to a capsule designed for insertion in a beverage production device for preparing a beverage from a substance contained in the capsule by introducing liquid in the capsule and passing liquid through the substance using centrifugal forces, the capsule comprising:

a body comprising a bottom end and an open end, spaced apart in the axial direction, an upper wall for covering the body at its open end, along a direction transverse to the axial direction, an enclosure between the body and upper wall containing a predetermined amount of beverage substance, the capsule comprising a flange-like rim extending outwardly from the body, wherein the flange-like rim comprises an annular flange portion and an annular pressure-setting ring extending from said annular flange portion;

wherein the annular pressure-setting ring forms a curled end of the flange-like rim.

The present invention furthermore relates to a set of capsules comprising at least two capsules of different type; preferably at least three capsules of different type, each capsule being configured according to the aforementioned capsule, wherein the distance in the axial direction above the plane of the annular force ring, differs as a function of the type of capsules.

As resulting from the difference of said distance in the axial direction, different back-pressure values are set by the pressure setting ring of the capsule when the capsule is engaged in the beverage producing device, thereby contributing to change the characteristics of the centrifuged beverage. In particular, as the distance above the plane of the annular pressure-setting ring increases, the preload on the valve means is increased thereby increasing the pressure in the capsule and the residence time of the liquid in the capsule for a given rotational speed.

The term "type of capsules" refers here to capsules having at least one difference which characterizes different beverages, e.g., coffee beverages, capable of delivering different key beverage attributes (aroma, intensity, crema/foam, flow-time, etc.), such difference being characterized by any one of the following parameters: size of the capsule, amount of the substance, density of the substance (e.g., tapped density), specific composition (e.g., blend, coffee origins), grind size, filling level and combinations thereof The term "size of capsule" means in particular, the storage volume of the capsule potentially available for receiving the substance and/or the external volume of the capsule, e.g., of its body.

The term "set of capsules" means a series of at least two, three, four, five, six capsules or more of different types.

Preferably, the distance, in the axial direction, below the plane (P) of the flange portion, of the annular pressure-setting ring is constant throughout the set. Therefore, this distance serves as a reference for all the capsules of the set thereby ensuring that each capsule is correctly positioned in the device and the pressure-setting ring does not deflect or deform significantly since such deflection or deformation could impact on the accuracy of the back-pressure setting.

The present invention further relates to a system for preparing a beverage comprising a capsule as aforementioned and/or a set of capsules as aforementioned, and a beverage production device, by introducing liquid in the capsule and passing liquid through the substance using centrifugal forces, the beverage production device comprising:
a capsule holder for holding the capsule at least at the flange-like rim during centrifugation,
rotational drive means for driving the capsule in centrifugation,
a liquid injecting member for feeding liquid in the capsule,
a spring-loaded valve member for engaging the pressure-setting ring of the capsule and/or a capsule of the set, when the capsule is inserted in the beverage production device to provide a flow restriction valve.

The invention also relates to the beverage production device as such.

The invention further relates to the use of a capsule, as aforementioned, in a centrifugal beverage producing device wherein the capsule is centrifuged in the device and the annular force ring is engaged by an enclosing member of the dedicated beverage production device; such force ring forming part of a valve means for selectively blocking and/or restricting the flow of the centrifugal liquid coming out of the capsule.

More particularly, the capsule holder comprises an annular transversal supporting edge comprising a first inward portion for supporting the annular flange portion and a second outward portion for supporting the annular pressure-setting ring, wherein the second outward portion forms a lowered step or recess as compared to the first inward portion.

In a preferred mode, the beverage producing device further comprises control means configured for controlling the liquid flow rate and/or the rotational speed of the drive means as a function of the type of capsule inserted in the device. In particular, controlling of the liquid flow rate and/or rotational speed can be carried out by maintaining at least one of these parameters (i.e., flow rate and/or rotational speed) constant or varying it according to a predefined evolution profile (e.g., rotational speed curve) or adjusting said parameter dynamically in function of the variation of another parameter, for example, the second of these parameters. In a particular mode, the liquid flow rate is maintained constant, at least for period of a time during extraction, by varying the rotational speed during the extraction process.

The invention as well relates to the use of the capsule as aforementioned in such device for delivering a beverage.

The invention may also relates to a capsule kit designed for being filled with a beverage substance and insertion in a beverage production device for preparing a beverage by introducing liquid in the capsule and passing liquid through the substance using centrifugal forces. The capsule kit may comprise all the characteristics of the capsule as described in the present description, in particular the pressure-setting ring. The capsule kit further comprises connection means enabling connection of the upper wall onto the body of the capsule; such connection means being configured to fix the upper wall to the body after filling of the capsule with beverage substance.

Connection means can be a press-fitting arrangement, a threading, an adhesive and combination thereof. The connection means are preferably designed such that a user is able to connect the upper wall on the body of the capsule without necessarily using tools.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIG. 1 represents a side view of a beverage capsule according to the invention; the capsule belonging to a series or set of capsules adapted for the production of a variety of coffee beverages and the capsule being the smallest of the series, FIG. 2 represents a detail of two bodies of capsules of FIG. 1, in particular, showing the pressure-setting ring, when the capsules are stacked on each other during storage.

DETAILED DESCRIPTION OF THE DRAWINGS

Figure 3:
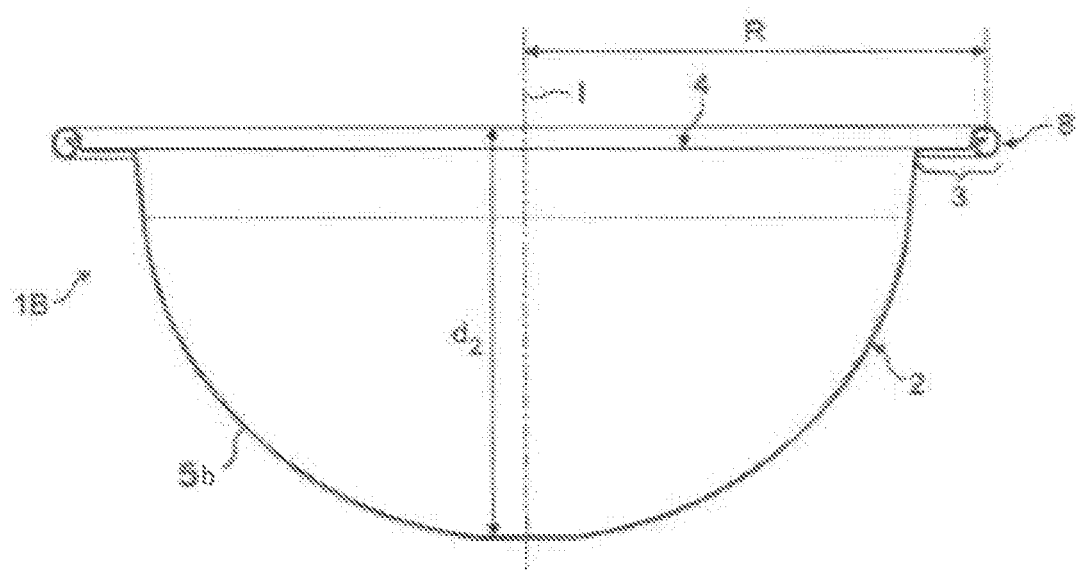
FIG. 3 represents a side view of a beverage capsule according to the invention; the capsule being of medium size in the series.
Figure 4:
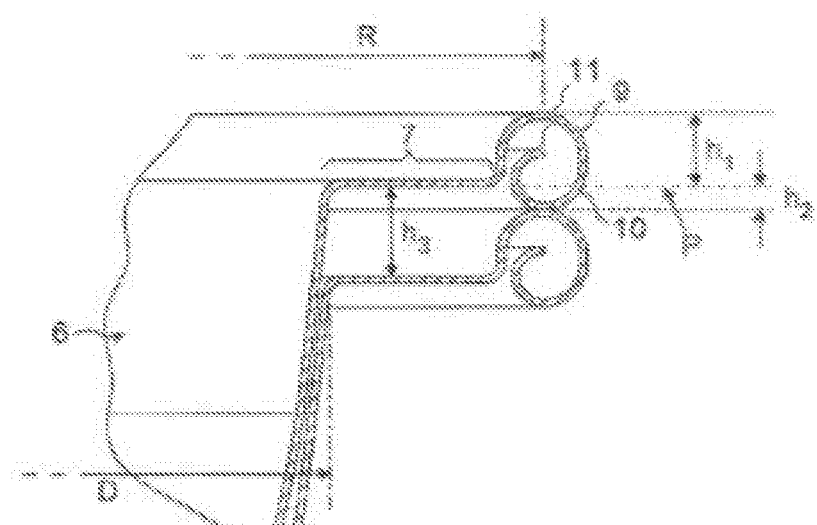
FIG. 4 represents a detail of bodies of capsules of FIG. 3 in stacking order.
Figure 5:
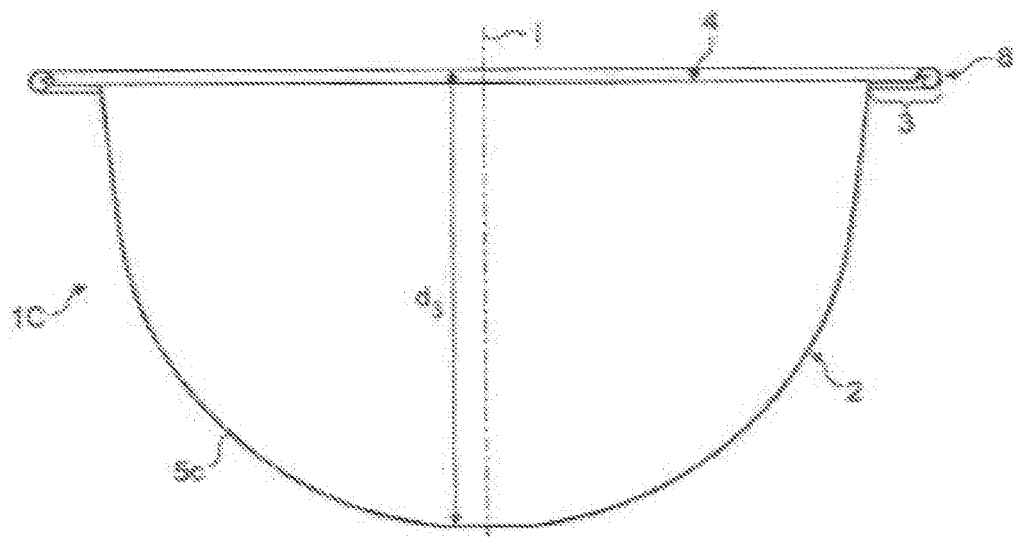
FIG. 5 represents a side view of a beverage capsule according to the invention; the capsule representing the largest size of the series.
Figure 6:
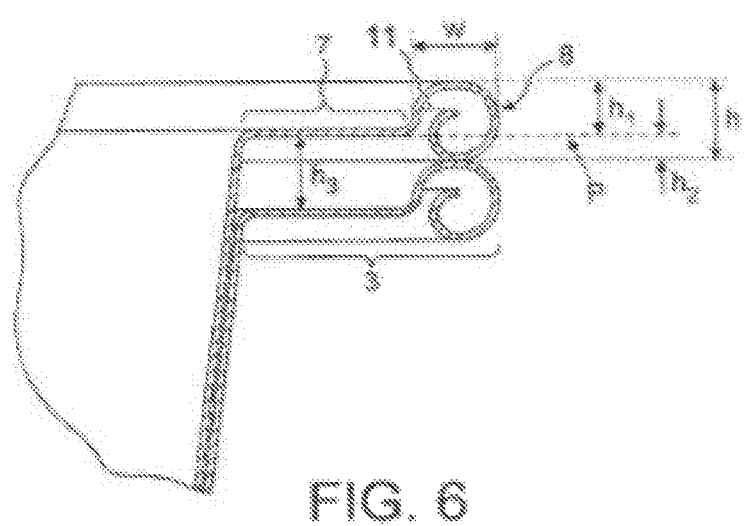
FIG. 6 represents a detail of bodies of capsules of FIG. 5 in stacking order.

FIGS. 1, 3 and 5, respectively FIGS. 2, 4 and 6 in stacking order for detail, relate to a preferred embodiment of a set of capsules 1A, 1B, 1C according to the invention. Each capsule is for a single use and designed to deliver a beverage from a beverage producing device. The capsule preferably comprise a cup-shaped body 2, a circular, annular flange-like rim 3 and an upper wall member of disc form, preferably, a perforable membrane 4. The cup-shaped body 2 may have a bowl as illustrated or other forms. Thereby the membrane 4 and the body 2 enclose an enclosure respectively ingredient compartment 6. As shown in the figures, the membrane 4 is preferably connected onto an inner annular flange portion 7 of the rim 3 that is preferably between 1 to 5 mm. The membrane 4 is connected to the rim 3 of the body by a seal such as a heat or ultrasonic weld line.

The rim is not necessarily horizontal as illustrated. It can be slightly bended, upwards or downwards, in order to increase the resistance of the seal to the increasing pressure pushing on the membrane with time, due to degassing of the capsule substance or ingredient with time.

Figure 7:
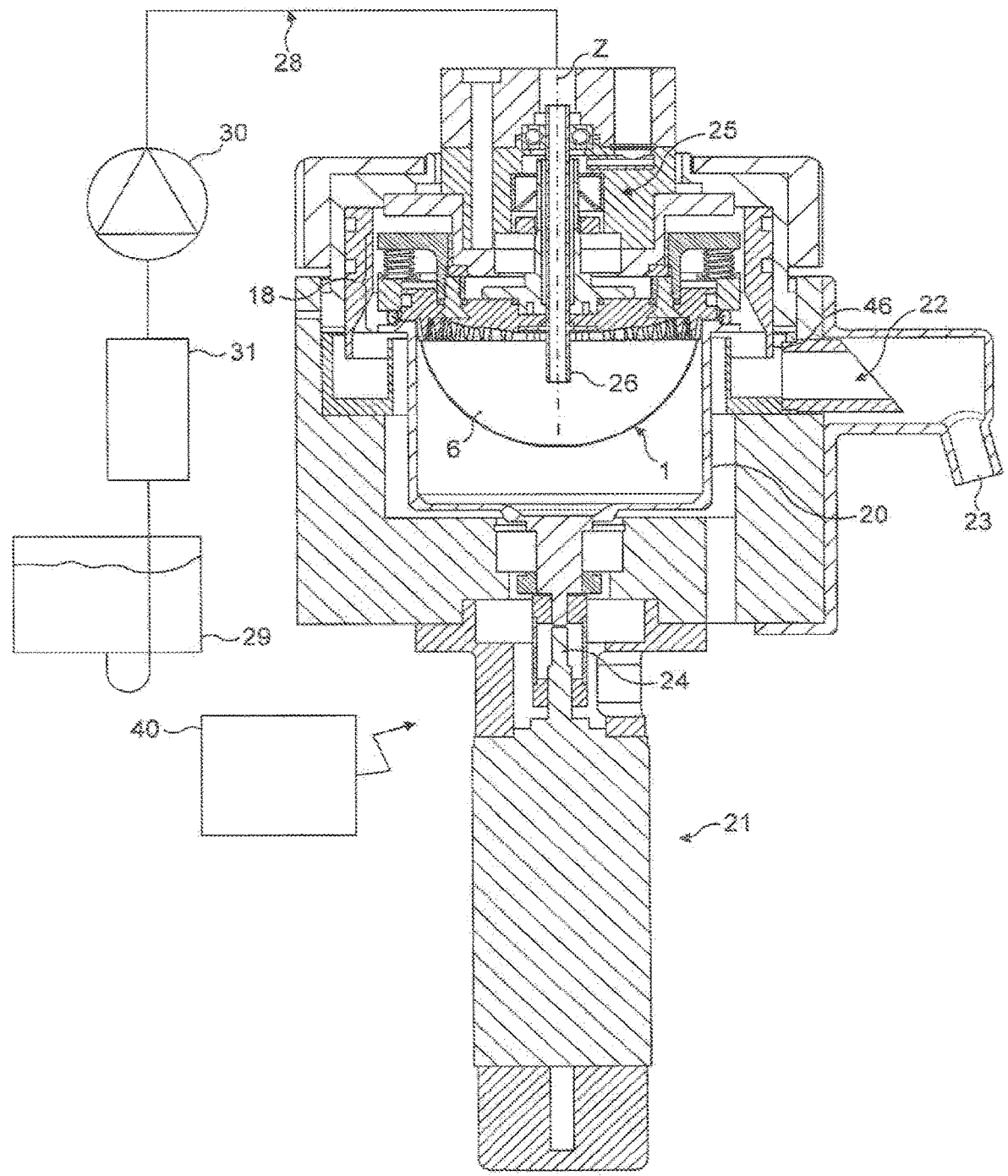
FIG. 7 represents a beverage production device in cross-section comprising a capsule of FIG. 1.
Figure 8:
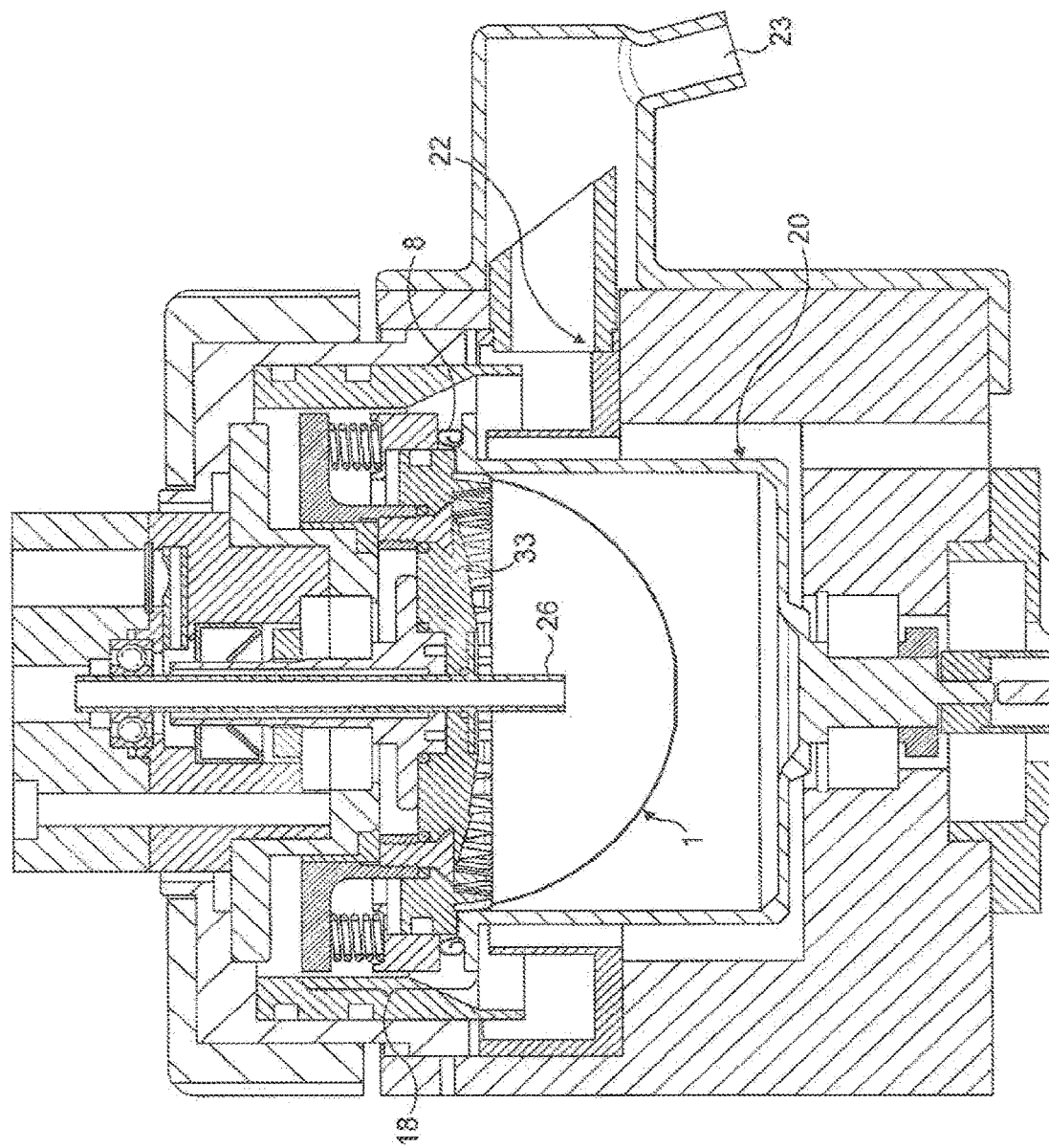
FIG. 8 is an enlarged cross-section view of the device including the capsule of FIG. 1.

The rim 3 of the capsules preferably extends outwardly in a direction essentially perpendicular (as illustrated) or slightly inclined (if bended as aforementioned) relative to the central axis of symmetry I of the body corresponding to the axis of rotation Z of the capsule 1 in the beverage production device (see FIG. 7). Generally, the axis I represents also the center around which the annular flange-like rim 3 extends in an annular configuration. Thereby, the axis of symmetry I is aligned with the axis of rotation Z during centrifugation of the capsule in the brewing device. For example, a slight inclination represents an angle of between about 1 and 30 degrees relative to the central axis of symmetry.

It should be understood that the shown bowl-shaped embodiment of the capsule is just an exemplary embodiment and that the capsule in particular the capsule body 2 according to the invention can take various different shapes.

The capsules 1A, 1B, 1C are preferably single-use capsules. However, it should be noticed that the capsules can deliver more than one beverage at a time, for example, a volume of coffee extract sufficient for filling two cups at a same time.

The body 2 of the respective capsules 1A, 1B, 1C has a convex portion 5a, 5b, 5c of variable depth, respectively, d1, d2, d3. However, the portion 5a, 5b, 5c may as well be a truncated or a cylindrical portion or a combinations of portions of different shapes such as truncated, cylindrical, spherical, etc.

Hence, the capsules 1A, 1B, 1C preferably comprise different ingredients' storage volumes but a same insertion diameter 'D'. FIG. 1 shows a small volume capsule 1A whereas FIG. 3 shows a medium volume capsule 1B and FIG. 5 shows a large volume capsule 1C. The insertion diameter 'D' is hereby determined at the line of intersection between the lower surface of the rim 3 and the surface of the sidewall of the body 2. However, it could be another referencing diameter of the capsule in the device.

The capsules of the invention 1A, 1B, 1C are also specifically dimensioned to provide optimal flow rates, at the pressure-setting ring 8 when the capsule is centrifuged in the beverage production device, as will explained later. For this, the radius R, representing the distance between the axis I and the distance hl above plane P, is preferably comprised between 24 and 31 mm. More preferably, this radius is comprised between 25 and 30 mm, even most preferably of about 28 (+/−1) mm. If the radius is too low, the flow rate decreases significantly at a same closing pressure on the ring. In order to compensate for such low flow rate, it is necessary to increase the rotational speed but this influence negatively on other factors such as the cost of the noise and cost of the system. On the other hand, a too high radius also impacts negatively on the stability during the centrifugation process of the system and creates a too cumbersome capsule in the device.

In addition, the larger internal diameter of the enclosure of the capsule as measured at the junction between the flange-like rim portion 7 and the body 2 (just below the upper wall 4) is preferably comprised between 45 and 50 mm. These limit values are also preferred to ensure a sufficient width of the outlet area at the upper wall of the capsule. The lower the value is, the lower the pressure is in the upper periphery of the enclosure at a given rotational speed. Above the upper limit, it would be no longer possible to position the force ring effectively.

The body 2 of the capsules is preferably rigid or semi-rigid. It can be formed of a food grade plastic, e.g., polypropylene, with a gas barrier layer such as EVOH and the like or aluminum or a laminate of plastic and aluminum, such as aluminum-PP (polypropylene) laminate, wherein preferably PP forms the inner layer of the laminate and aluminum forms the outer layer of the laminate. Additional lacquers or color layers can be provided. The membrane may also be formed of paper and plastic, paper and aluminum or a combination of paper, aluminum and plastic. Plastic also includes biodegradable plastics such as crystallized PLA or equivalent. The membrane 4 can be made of a thinner material such as a plastic film also including a barrier layer or aluminum or a combination of plastic and aluminum. The membrane 4 is usually of a thickness between 10 and 250 microns, for example. The membrane is perforated for creating the water inlet as will be described later in the description. The membrane also further comprises a perforable peripheral area.

Instead of the membrane 4, the capsules 1A, 1B, 1C may as well comprise rigid, semi-rigid or flexible engagement lid member which preferably has the form of a disc comprising a central portion having an inlet port for enabling the introduction of a water injection member and a peripheral portion having circumferentially arranged outlet openings.

For instance, the outlet openings can be formed by an annular layer of filter paper and/or plastic fabric. The inlet port and/or outlet openings are thereby premade before insertion of the capsule in the device. They can be covered by a removable gas-tight layer before insertion such as an overwrapping package or a peelable membrane.

The volume difference between the small and large capsules is obtained particularly by varying the depth $d_1$, $d_2$, $d_3$ of the body 2 of the capsules in the set. In particular, the depth of the body of the smaller capsule 1A is lower than the depth of the body of the medium-size capsules 1B and the depth of the body of the medium-size capsule is lower than the depth of the body of the larger size capsule 1C.

More generally, the internal volume of the capsule is preferably comprised 18 ml and 50 ml. These volumes have been determined to offer both enough room for receiving a sufficient amount of coffee powder while providing optimized centrifugal (coffee) extraction conditions.

Another variant would also consist in having only capsules of the largest size (FIG. 5) and different filling levels of substance accommodated in the compartments depending on the type of beverage to be produced (e.g., ristretto, espresso, lungo, long coffee, whitened coffee, tea, chocolate, etc.).

The capsules are filled with beverage substance in function of their size. Such size can be determined as aforementioned by preferably varying the depth of the capsule $d_1$, $d_2$, $d_3$. Therefore, the smaller volume capsule 1A contains an amount of extraction substance, e.g., ground coffee, smaller than the amount for the medium volume capsule 1B and the medium volume capsule contains an amount of extraction substance, e.g., ground coffee, smaller than the amount for the largest size capsule 1C.

Hence, the small capsule 1A is preferably intended for delivering a shorter coffee beverage of between 10 ml and 60 ml with an amount of ground coffee comprised between 4 and 8 grams. The larger capsule 1B is intended for delivery of a medium-size coffee, e.g., between 60 and 120 ml and the largest capsule 1C is intended for delivery of a long-size coffee, e.g., between 120 and 500 ml. Furthermore, the medium-size coffee capsule 1B can contain an amount of ground coffee comprised between 6 and 15 grams and the long-size coffee capsule 1C can contain an amount of ground coffee between 8 and 30 grams. The filling level of substance in the capsules can also be set to ensure a well distributed flow of liquid in the ingredients without creating preferred liquid path due to the centrifugal forces in the capsules. In general, the substance should not be filled to create a compact cake or be filled to the top of the capsule in a compact way before use (i.e., centrifugation of the capsule in the device).

Preferably, the capsules in the set according to the invention may contain different blends of roast and ground coffee or coffees from different origins and/or having different roasting and/or grinding characteristics. The mean particle size ($D_{4,3}$ of roast and ground coffee contained in the capsule can be comprised between 120 and 750 microns, preferably between 160 and 500 microns.

In general, the substance may include roast and ground coffee, soluble coffee, creamers (dairy or non-dairy), tea (e.g. grey, green, white or herbal), cocoa, chicory, infant formula and combinations thereof. Additives may also be added such as sweeteners (sugar, aspartame, stevia, etc.), flavorings (cinnamon, vanilla, almond, herbs, etc.), processing aids, emulsifiers, foam boosters, fruit or plant extracts, micronutrients and combinations thereof.

The capsules of the invention, as illustrated in FIG. 2, 4 or 6 more particularly comprises at its flange-like rim 3, an annular pressure-setting ring 8 protruding, both upwardly and downwardly from the inward flange portion 7. In particular, the pressure-setting ring, whose function will be explained later on, comprises an upper portion 9 extending, in the axial direction of the capsule, above a plane P passing by the flange portion 7 and a lower portion 10 extending below the plane P still in axial direction of the capsule. By convention, the reference to plane P is here taken along the lower surface of the flange portion 7. In the context of the invention, the term "axial direction" refers to any direction aligned or parallel to the central axis I of the capsule. The term "transversal direction" refers to any direction perpendicular to the central axis I or inclined of an angle greater than 45 degrees. The term "lower" and "upper" refer here to the relative positions of the means, as illustrated, when the upper wall 4 of the capsule is oriented upwards and the bottom of the body 2 downwards. More preferably, the upper portion 9 of the ring extends by a distance "$h_1$" which is longer than the distance "$h_2$" of the lower portion 10. In particular, the distance "$h_1$" determines the axial length of the pressure-setting ring in the set of capsules. For this, the distance "$h_1$" varies in the set whereas the distance "$h_2$" remains constant in the set. Therefore, for example, the smallest capsule 1A is provided with a pressure-setting ring 8 which extends, above plane P, a distance $h_1$ which is greater than the distance $h_1$ of the force ring, above plane P, of the medium-size capsule 1B. Comparatively, the distance $h_1$ of the pressure-setting ring of the medium-size capsule 1B is also greater than the distance $h_1$ of the largest-size capsule 1C. Thereby, the distance $h_1$ preferably decreases with the increase in size of the capsule, e.g., such as depth ($d_1$, $d_2$, $d_3$) increasing in the set. This will result in setting different back-pressure values in the beverage production device, as will be later explained, to adapt the brewing characteristics to the type of capsules, in particular, to its size and coffee powder content. Thereby, the thickness $h_1$ of the pressure-setting ring 8 is preferably adapted to the type of capsule, more particularly, to the amount and/or characteristics of the beverage substance contained in the shown capsules 1A, 1B, 1C in order to enable an adjustment of the back-pressure exerted onto the capsule when being inserted in the beverage production device. For example, for capsules containing a small amount of beverage substance—e.g. capsule 1A—in order to prepare e.g. a ristretto or espresso coffee beverage, a high pressure extraction might be desired for providing the coffee with a high intensity (i.e., a large amount of total coffee solids transferred in the coffee extract) and a thick crema. These characteristics can be compared to a lower pressure extraction which might be desired for the beverage coming out of capsules 1B or 1C containing a larger amount of coffee powder. Therefore, for a given rotational speed during the beverage extraction, the back-pressure of a capsule 1A of smaller volume containing a smaller amount of substance is adapted to be higher than the backpressure of larger capsule 1B or 1C containing a higher amount of substance. Of course, the rotational speed may also vary depending on the type of capsules 1A, 1B, 1C and the beverage to be produced.

In a preferred mode of the invention, the pressure-setting ring 8 of the capsule is formed by a rolled over edge or curl of the flange-like rim thereby forming a curl which may be closed or partially closed. In particular, the curl can be formed from a ply of material by any suitable forming technique such as embossing, stamping, molding, etc. Preferably, the upper portion 9 forms an intermediate portion as a ply of material between the flange portion 7 of the rim and the portion 10. The lower portion 10 can extend by a re-entrant portion 11 of the ply forming the end portion of the curl. It should be noted that the upper portion 9 can be convex in the axial direction, as illustrated, but other forms are possible such as flat or concave. Similarly, the lower end of the lower portion 10 can be convex in the axial direction, as illustrated, but other forms are possible such as flat or concave. Furthermore, the pressure-setting ring is preferably of hollow shape when in form of a curl as shown but a plain (i.e., non-hollow) ring is also envisaged as a possible alternative. For example, the ring can be formed as a curl and filled with material such as plastic or rubber to improve its resistance to deformation in axial direction.

For capsules 1A, 1B, the pressure-setting ring may be of oval form in the axial direction since the height "h" of the ring corresponding to the sum of distance $h_1$ and distance $h_2$ is greater than the width "w" of the ring. For capsule 1C, the width "w" can be equal making the curl substantially round or slightly longer than the height "h" of the ring thereby making the curled ring oval in the transversal direction.

As illustrated in FIGS. 2, 4 and 5, the pressure-setting ring 8 fulfils also the function of maintaining a distance between the bodies of capsules when stacked in each other. Therefore, it facilitates de-stacking of the bodies of the capsules during storage, in particular, during manufacturing, e.g., before the bodies are filled with the beverage substance. As shown in FIG. 2, for instance, when the stacked bodies come in abutment by contact between the lower portion 10 onto the upper portion 8 of the pressure-setting ring, the distance $h_1$, $h_2$ of the respective portions 9, 10 ensures that the flange portions 7 remain distant (see distance $h_3$) from each other and do not enter directly in contact with each other. Such configuration greatly facilitates de-stacking of the bodies and thereby enables the manufacturing of the bodies of the capsules in a manufacturing area which is remote from the capsule manufacturing site (coffee handling, filling, sealing, etc.).

FIG. 7 shows a sectional side view of a beverage production device according to the capsule system of the invention in a closed state thereof. Thereby, the device comprises a rotating capsule holder 20, a driving means 21, and a collector 22 onto which the centrifuged liquid impacts and drains through a beverage outlet 23. The driving means 21 comprises a rotary motor which is linked to the capsule holder 20 at the bottom side (as illustrated) or top side (not illustrated) through an axle 24 axially connected to the capsule holder. The capsule holder 20 has a circumferential surface that forms a referencing diameter substantially equal to diameter 'D' of the capsule 1 so as to ensure a tight fit of the capsule in the capsule holder 20 without possible radial play. The capsule holder 10 is preferably hollow or deep enough at its center to be able to accommodate all capsules of the set. Accordingly, a unique capsule holder is sufficient to receive all the capsules 1A, 1B, 1C of the set. It should be noted that the capsule holder can take various shapes and may also be formed of a simple annular hollow ring.

Furthermore, the device comprises water injection means 25 having an injection member 26 being arranged to perforate the membrane 4 of the capsule 1 in a central portion thereof. As already described in WO2008/148604, the injection means 26 are connected to a liquid circuit 28 comprising a liquid supply 29 such as a water tank, a pump 30 and liquid heating apparatus 31 for providing a predefined volume of heated pressurized liquid to the capsule 1 during the beverage extraction process. Liquid is usually water (heated, ambient or cooled). The liquid is fed in the capsule by injection through the injection member 26 having the form of a hollow needle or tube. The injection member can be formed of a sharp free end to ensure perforation of the upper wall, if necessary. The device also comprises a series of outlet perforators 27 as described in WO2008/148604. The outlet perforators are provided at the periphery of the engagement lid 33 which engages the upper wall of the capsule during closure of the device. Accordingly, outlets are produced in an annular portion of the membrane 4 thereby enabling an extracted (centrifuged) beverage to leave the capsule 1 during the rotational movement thereof.

The device further comprises a control unit 40 which controls the different elements of the device, in particular, the pump 30, heater 31 and rotational speed of the driving means 21. In particular, the control unit is programmed to adjust operational parameters during extraction including (but not limited) to: pump flow rate, pump pressure, water temperature, rotational speed, rotational speed cycles (e.g., speeds during prewetting, extraction, drying phases, etc.). Several programs can be designed specifically to the different types of capsules 1A, 1B and 1C, for example delivering specific beverages, e.g., ristretto, espresso, lungo, Americano, etc., and/or beverages having specific strength, aroma profiles, foam/crema volume, etc. The capsules can comprise an identification code, such as a barcode, radio-frequency tag, etc., for enabling the identification in the device and for setting of the operational parameters automatically. In this case, the device comprises suitable code reading means associated to the control unit. The control means and code can be configured to ensure a control of key brewing parameters such as any one or any combinations of the following parameters: liquid volume (small, medium, long, extra-long cups, etc.), rotational speed of the driving means, liquid pump speed or speed cycle (e.g., slow speed for prewetting, high speeds for extraction and drying), liquid heating temperature, etc.

Figure 9:
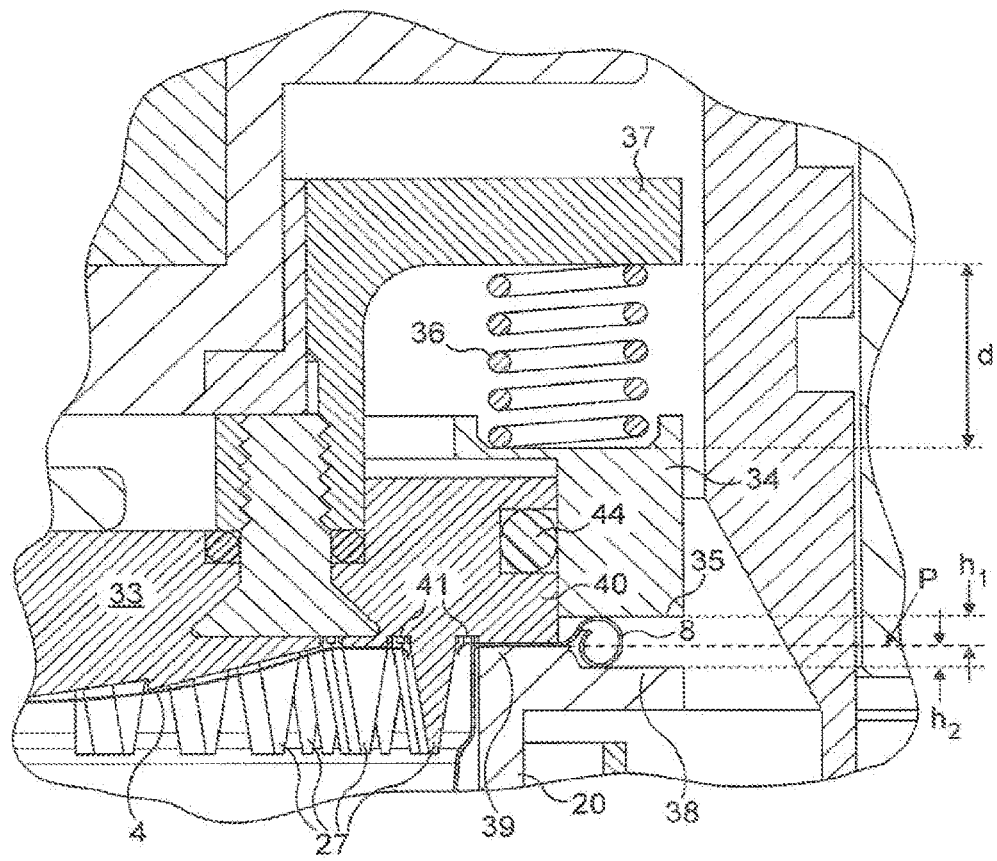
FIG. 9 is an enlarged cross-section view of FIG. 8.

The system of the invention comprises a valve means 18 capable of providing a back-pressure against the centrifuged liquid that leaves the capsule through its outlets (perforated or premade). The valve means 18 is formed by the complementary engagement of the device on the capsule. More particularly (FIG. 9), the device comprises a valve member 34 which is arranged circumferentially relative to the engagement lid 33 and which has a lower annular pressing surface 35. On the capsule's side, the valve means comprises the pressure-setting ring 8 which is engaged by the annular pressing surface 35 of the valve member 34 of the device. The pressing surface 35 engages the upper portion of the pressure-setting ring under a predetermined backpressure. The pressure engagement of the two complementary portions 34, 8 of the valve means is made resilient by means of a spring-biasing means such as springs 36 placed between the valve member 34 and an annular counter-force element 37, connected directly or indirectly to, or part of the engagement lid 33. Several springs 36 (for instance 6 to 10 springs) can be evenly placed at the periphery, between the portion 34 and element 37, such as helical springs in parallel to distribute and balance the preload onto the rim of the capsule evenly. Of course, other equivalent resilient means for replacing the springs can be envisaged without departing from the scope of the invention.

The valve member 34 and the injection unit 25 are typically movable with respect to the capsule holder 20 (or vice versa) via a closure system (not shown) in order to enable insertion and ejection of the capsule 1 to and from the capsule holder 20 before respectively after the beverage extraction process. The closure system can be a mechanical and/or hydraulic closure mechanism. Many mechanical closure mechanisms are known for coffee machines such as levers forming a knee-joint, or a cam-type closure and the like. Moreover, the water injection means 25, the valve member 34, the capsule 1 and the capsule holder 20 are all rotatable about axis Z during the centrifugation process. The valve member 34 is also made moveable independently from the engagement lid 33 to take into account the different possible thicknesses of the capsules without affecting the relative position of the injection portion when engaging the capsule. For this, portion 34 can be slidably mounted about engagement lid 33. A joint 44, such as an O-ring, can be provided between the two parts 33, 34 to ensure liquid-tightness of the valve means.

On the capsule's holder side, the pressure-setting ring 8 is firmly supported by a lowered portion or recess 38 of the supporting edge of the capsule holder 20. The lowered portion or recess 38 is lowered relative to a flange-supporting portion 39 of the edge of the capsule holder which holds the flange portion 7 of the rim. The height of the step between the lowered portion 38 and the supporting portion is preferably equal or close to distance $h_2$ in order to ensure a correct fitting between the capsule and the capsule holder and a firm support of the ring 8 by the capsule holder. However, it could also be that the distance "$h_2$" of the ring is smaller than the height of the step thereby causing the force ring to be bent relative to the flange portion 7 under the pressure of the valve member 34. The flange portion 7 can be further pressed by a peripheral portion 40 of the engagement lid 33. The peripheral portion 40 comprises channels or recesses 41 radially oriented to ensure that the centrifuged liquid, which leaves the outlets perforated by the perforating means 27, can traverse the engagement lid on its way to the valve means 18. It is possible that the flange portion 7 has a form or line of curvature (e.g., slightly concave, convex or inclined) that slightly differs from the profile of the flange-supporting surface 39. In that case, the flange portion 7 can still be deformed by the peripheral portion 40 of the engagement lid 33, e.g., be flattened against the supporting surface 39 to ensure fitting of the force-ring in recess or lowered step 39.

Figure 11:
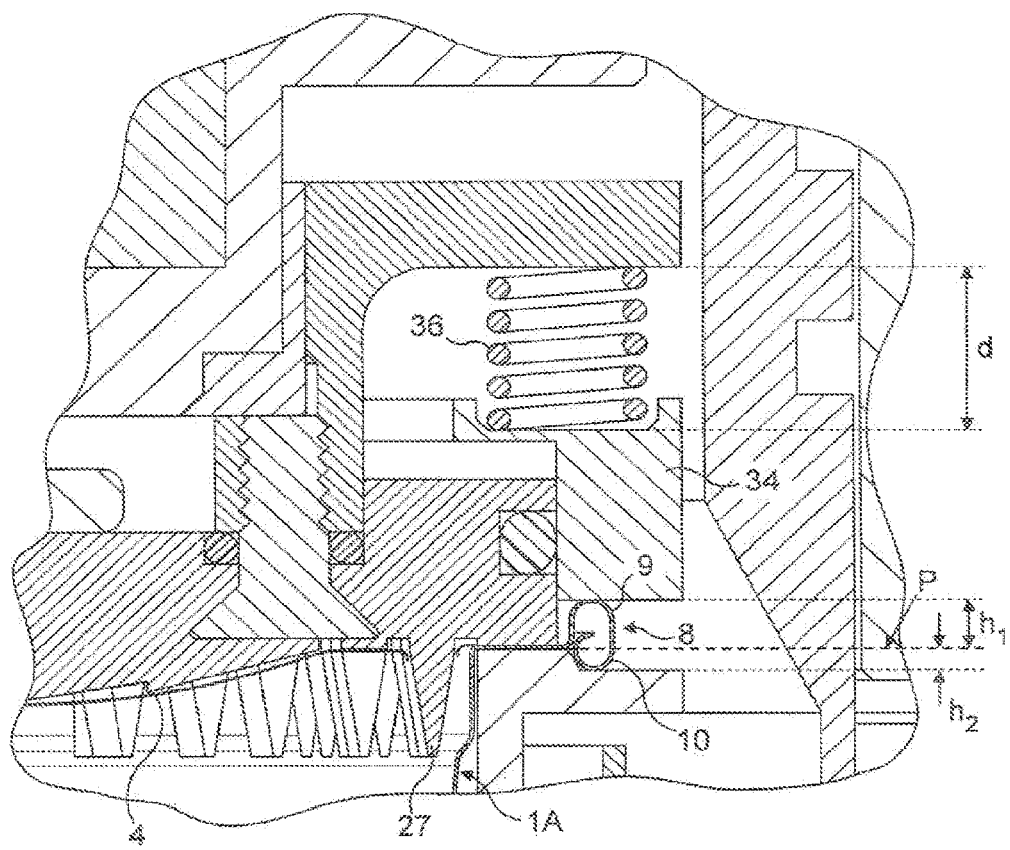
FIG. 11 is an enlarged cross-section view similar to FIG. 9 for the capsule of FIG. 5.

Therefore, the backpressure of the valve means is predetermined essentially by the pressure-setting ring 8 that changes the relative position of the valve member 34 and the compression of the spring-biasing means 36. Depending on the type of capsules, e.g., capsules 1A, 1B or 1C placed in the device, the backpressure varies as resulting from the different geometries of the pressure-setting ring 8. Capsule 1A of FIG. 9 has a shorter ring 8 compared to capsule 1C of FIG. 11. In particular, as already mentioned, the distance $h_1$ is comparatively lower for capsule 1A whereas the distance $h_2$ is equal for all capsules 1A-1C. As a result, the spring-biasing means 36 becomes less pre-compressed when capsule 1A is engaged in the device than when capsules 1B or 1C are engaged. As the spring-biasing means 36 is more compressed, the distance "d" representing the total length of the spring-biasing means is reduced thereby increasing linearly the preload or force exerted onto the ring of the capsule according to Hooke's law. The reduction of distance "d" results here directly from the increase of distance $h_1$ of the pressure-setting rings since these elements are all placed in axial linear direction. Therefore, as distance $h_1$ decreases in the set of capsules, the preload exerted by the spring-loading means (i.e., springs 36) on the valve member 34 and, consequently, on the pressure-setting ring 8 decreases since the spring length "d" increases. This configuration results in a simple mechanical control of the backpressure of the valve means 18 using these selectively designed capsules. For example, depending on the type of capsules, the backpressure (i.e. the pressure above the atmospheric pressure) exerted by the valve means can range between 5 $N/cm^2$ (0.5 bar) and 180 $N/cm^2$ (18 bar), more specifically between 15 $N/cm^2$ (1.5 bar) and 134 $N/cm^2$ (13.4 bar), most specifically between 27 $N/cm^2$ (2.7 bar) and 87 $N/cm^2$ (8.7 bar). These pressure values are herein measured by measuring the axial compressive force of the engaging surface 35 onto the pressure setting ring 8 in a closed position of the valve and dividing by the surface of contact between these two parts of the valve means. More particularly, the smaller coffee capsule 1A is designed to deliver ristretto (about 25 mL) and espresso coffee (about 40 mL) with the highest backpressure due to its longer upper portion of thickness $h_1$ of the ring, for instance, backpressure values between 100 and 180 $N/cm^2$. The medium-size coffee capsule 1B is more designed to deliver lungo coffee (about 100-120 mL) with backpressure values in the range of 50 and 140 $N/cm^2$. The largest size capsule is designed to produce long coffee (about 150-250 mL) with the lowest backpressure such as within the range of 5 to 80 $N/cm^2$. Coffee beverage of different quality attributes can be obtained, in particular, extraction yields comprised between about 10 and 30%, total solids between about 0.5 and 2.5% in weight and a stable crema. The definition for the extraction yield and total solids for coffee beverage is given, for example, in EP1566127.

It should be noted that an identification means is preferably associated to each type of capsule to ensure setting of the proper parameters in the beverage producing device corresponding to the type of beverage to be dispensed, in particular, the beverage volume (e.g., 25, 45, 110, 150, 250 mL, etc.), flow rate and/or the rotational speed determining the residence time and flow rate of the beverage or liquid. Identification means can be a code such as a barcode, RFID, color recognition, magnetic or ferromagnetic means, mechanical prongs and so on.

In the device of the invention, extraction of the beverage out of the capsule 1 is obtained by driving the engagement lid 33 of the injection unit 25 (the injector 26 preferably remaining static), the valve means 18, the capsule holder 20 and capsule together, in rotation about axis Z, at an extraction speed, e.g., between 500 and 16500 rpm that can be constant or variable. The speed must be sufficient during extraction to create a centrifugal pressure of liquid in the capsule enabling opening of the valve means as described.

Figure 10:
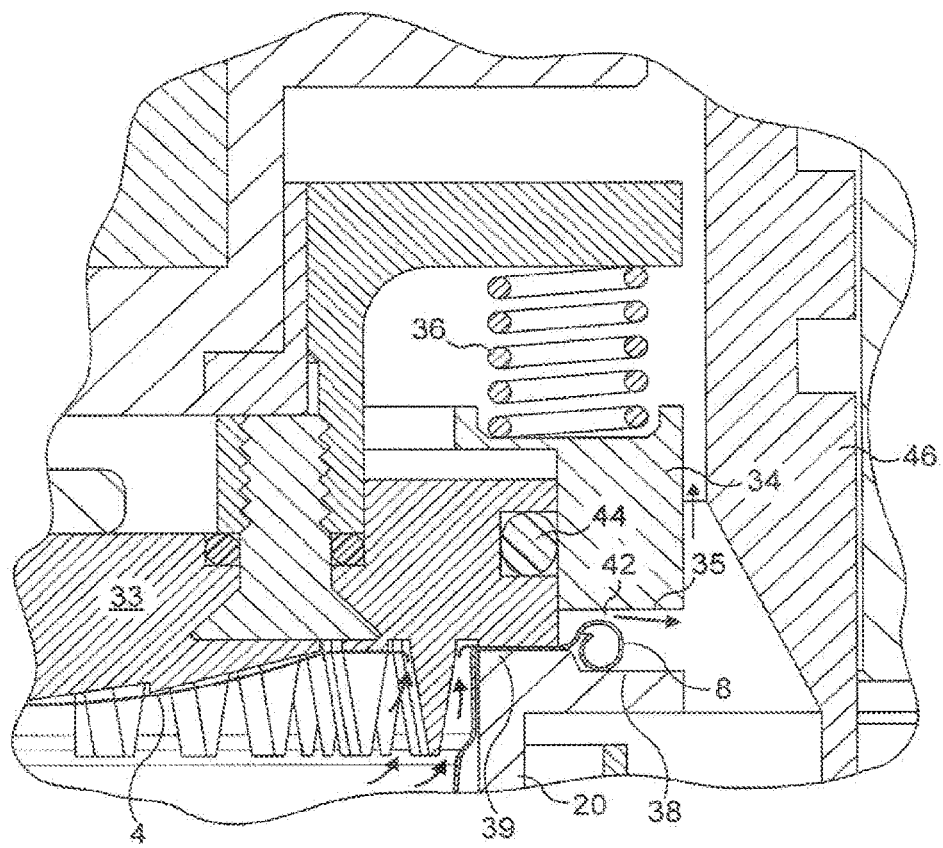
FIG. 10 is an enlarged cross section view of FIG. 8 during centrifugation of the liquid from the capsule in the device.

Liquid which is centrally injected into the capsule 1 will tend to be guided along the inner surface of the side wall of the body 2, up to the inner side of the membrane 4, and then through the perforated outlet openings created in the membrane 4 by the perforating members 24 then through the valve means 18 between surface 35 and top of the ring 8. Liquid can be filtered by the interstice created between the perforators 27 and the membrane 4 to ensure that non-soluble solid (e.g., coffee) particles, are maintained in the capsule. Filtration may also be carried out by a separate filter inserted in the capsule. Due to the centrifugation of the liquid in the capsule 1, the liquid and the beverage substance (e.g., roast and ground coffee powder) provided within the capsule are made to interact in order to form a liquid comestible (e.g., coffee liquid extract). FIG. 10 illustrates the system when beverage is centrifuged out of the capsule and the valve means 18 is opened sufficiently so that liquid passes between the pressure-setting ring 8 and the valve member 34. Centrifuged beverage is given a sufficient pressure upstream the valve means to open it and create an annular restriction opening 42 for liquid flow to be projected towards the impact wall 46 of the collector at high velocity. Opening of the valve means is again obtained by the liquid forcing the valve member 34 to further urge against the springs 36. The valve member 34 is preferably formed of a non-compressible material such as hard plastic or metal. However, it should noted that the valve member and the springs could be made of an integral compressible part ensuring both engaging and resilient functions such as if made of an annular rubber ring or block. The surface area of the restriction opening is preferably comprised between 0.5 and 15.0 $mm^2$, more preferably 1 and 10 mm2. The surface area of the flow restriction can vary depending on the set backpressure value and the rotational speed of the capsule wherein in general the higher the speed, the larger the surface area for a given backpressure.

As mentioned earlier, for a beverage substance which is essentially roast and ground coffee, the capsule is configured such that radius R is comprised between 22 and 31 mm, more preferably between 24 and 30 mm, most preferably between 25 and 29 mm. Surprisingly, these ranges improve the in-cup coffee quality. When the radius exceeds the maximal value, the coffee extract experiences a lower aroma content. In particular, the values of flow rates are improved and reasonable rotational speed limits are maintained.

It should be noted that a small liquid leakage through the valve means 18 can be required that helps to vent the gas or air contained in the capsule during the filling of the capsule with liquid at the beginning of the beverage preparation process. This leakage may be obtained by small radial grooves, orifices, embossments, etc., provided in any of the valve members (for instance on surface 35 of the device and/or on the surface of the upper portion 9 of the ring).

The rotational speed is also adjusted to match a preferred flow rate of the centrifuged liquid out of the capsule. After filling of the capsule with water and during the extraction phase, water continues to be fed in the capsule by the water pump at a flow rate that substantially equals the flow rate of centrifuged liquid (since the capsule is full of liquid filling the voids). At the end of the extraction phase, the water pump may be stopped while centrifugation is maintained to empty the capsule from residual liquid. This is typically the water flow rate that can be controlled during the extraction phase. Water flow rate can be measured by a flow meter placed in the fluid circuit downstream of the water pump and controlled by control unit 40. It could also be theoretically possible to measure the beverage flow rate downstream of the valve means but implementing a flow meter in this area is more complicated. The rotational speed fluctuates during extraction phase to match a flow rate of reference as preset in the control unit. The preset flow rate is chosen as a function of the type of capsule and/or beverage to be delivered. An advantage of capsules with pressure-setting ring capable of setting different backpressure values also lies in the possibility to provide different ranges of flow rate while centrifugation within a more narrow rotational speed range. Therefore, much lower rotational speeds can be run while still achieving a same diversity of coffee. The machine is thus submitted to lower mechanical constraints as centrifugal forces are lower so the system can be designed with lighter/less material and globally less electrical power is consumed. The preferred method of controlling the flow of beverage according to the set backpressure by adjusting rotational speed of the driving means is described in detail in co-pending European patent application 09178382.9 entitled: "Capsule system with flow adjustment means". This patent application is here incorporated by reference. Of course other controls of the beverage characteristics are possible such as setting different predetermined ranges of rotational speeds (or different fixed values) which are set according to the different types of capsule (1A, 1B, 1C).

Figure 12:
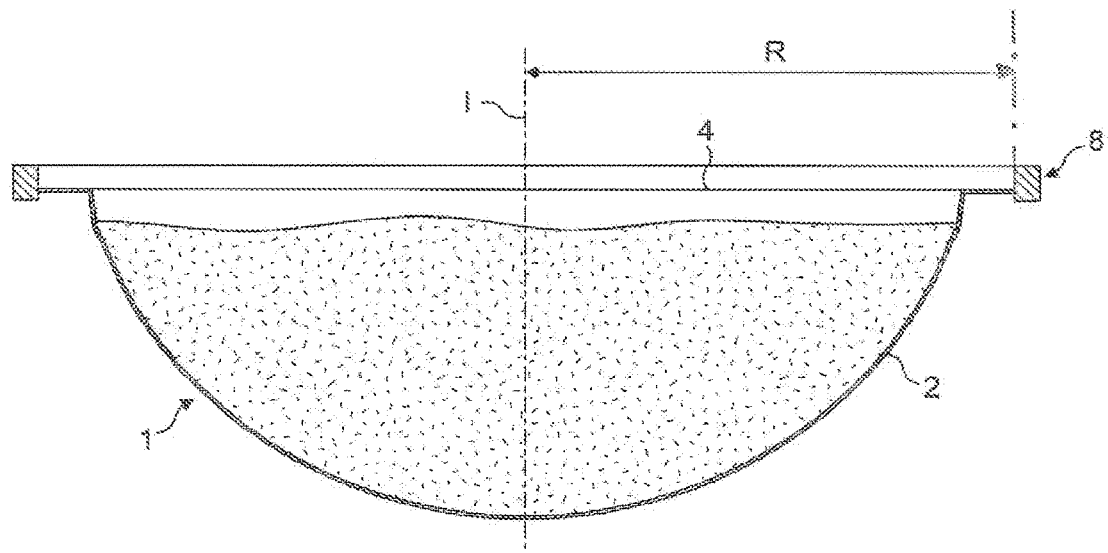
FIG. 12 is a side view of a capsule of the invention according to a second embodiment.
Figure 13:
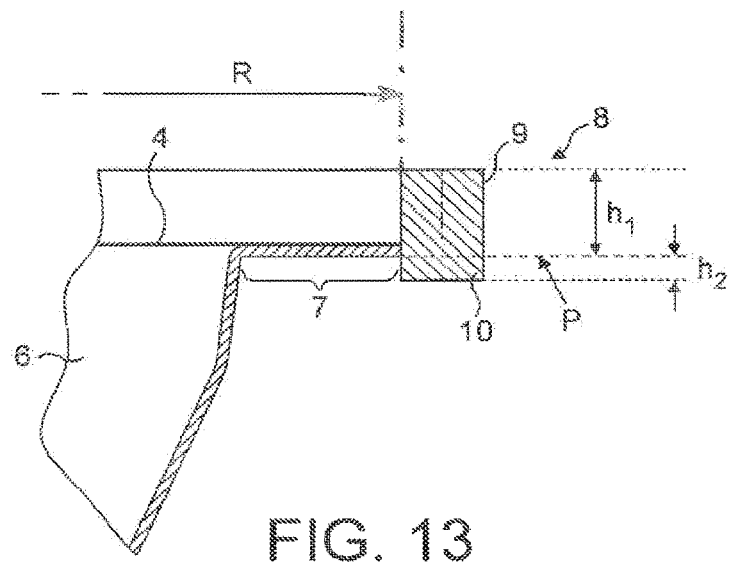
FIG. 13 is an enlarged cross section view of a detail of the capsule of FIG. 12.

FIGS. 12 and 13 illustrate another possible embodiment of the capsule of the invention in which the pressure-setting ring 8 is formed of a plain (i.e., non-hollow) portion extending both above and below plane P from the flange portion 7 of the flange-like rim 3 in the axial direction. As in the previous embodiment, the pressure-setting ring 8 comprises an upper portion 9 forming a distance $h_1$ as measured from the transversal plane P and a lower portion 10 forming a distance $h_2$ as measured from plane P. The distance $h_1$ is preferably higher than distance $h_2$. Furthermore, the distance $h_1$ varies in function of the type of capsules in the set whereas $h_2$ preferably remains at a constant value in the set of capsules. The flange-like rim 3 is preferably formed as an integral part of the body of the capsule including the pressure-setting ring. Considering the flat top surface of the ring, the radius R is here measured at the highest distance ($h_1$) of the ring but also the closest one to the central axis "I" (i.e., at the inner edge of the top flat surface) which thereby corresponds to the closest pressure point of the ring relative to the central axis "I". Therefore, the radius is here independent from the transversal width of the ring. Of course, the top edge of the ring could also be concave with the highest distance ($h_1$) being the one transversally closer to the central axis "I". The force ring can be made of plain plastic such as polypropylene or polyethylene or a combination of plastics such as PP-PE, PP-PET, PE-PET, PP-PE-PET, PP-EVOH-PET or PE-EVOH-PET or combinations of plastic and metal such as PP-aluminum or PE-aluminum and lacquers, coloring layers, adhesives, etc. It can be formed with the body by injection-molding or thermoforming. The pressure-setting ring can be rectangular as shown or round or oval as well. The flange portion 7 can be flexible to deform during insertion and engagement by the engagement lid of the injection means.

In another possible mode (not illustrated), the capsule may comprise a pressure-setting ring which is part of the upper wall, e.g., part of the membrane or attached to it, instead of being part of the body. For instance, the ring can be formed of an annular extension of the membrane and sealed to it. In this case, the pressure-setting ring extends both axially and transversally beyond the flange portion but might not be necessary directly connected to it or be integral with it. It can also be envisaged a force-pressure ring that is separate from the body and attached to the flange portion of the body by press-fitting or clipping.

In another possible variant, the pressure setting ring of the capsule extends only above plane "P" but forms no extension below plane "P" in the direction of the bottom of the body. In this case, "$h_1$" varies in the set as aforementioned and "$h_2$" is zero millimeter.

The invention also encompasses a fillable capsule kit designed for receiving beverage substance (e.g., ground coffee). In this mode, the upper wall of the capsule is connectable to the body using removable connection means enabling the filling of the capsule with beverage substance before insertion in the beverage producing device. Connection means can be press-fitting, adhesive, a threading and combinations. For instance, the upper wall may be a disc of perforable material (e.g., thin aluminum foil) that can be connected by the user to a cup-shaped body by a tacky adhesive layer after removal of a protective band covering said adhesive layer. The adhesive layer can be formulated to provide a sufficient adhesion for closing the capsule and enabling perforation in the device. The layer may be supported by the membrane and/or flange portion of the body.

EXAMPLES

The objective of the tests was to evaluate the impact of the radial distance (R) of the pressure setting ring of the capsules of the invention on the content of important aroma compounds in order to improve the cup quality of coffee extracted by centrifugation.

The analysis was performed with Nespresso Arpeggio roast and ground coffee blend prepared at 25 ml cup size. For each system five preparations were made and merged to give a representative sample for both systems. The samples were immediately cooled down in crushed ice and kept at −20° C. until analyzed. All samples were analyzed in triplicate.

13 key aroma compounds were selected representing all major compound classes (Sulphur compounds, aldehydes, phenols, diketones, pyrazines).

Absolute concentrations were determined by SPME-GC/MS analysis using isotope labelled compounds as internal standards (IDA).

Two different capsule diameters (D) were studied, respectively, 52 and 63 mm. The capsule was designed such that the radial radius (R), as defined previously, was equal to D/2 with a tolerance of +/−0.5 mm.

Two rotation speeds were tested: 5000 rpm and 10000 rpm.

The coffee grind size ($D_{4,3}$) tested was 260 microns.

The results of the aroma content present in the coffee beverages prepared by capsules with two different diameters (2·R) are shown in the table below.

The increasing of the diameter from 52 to 63 mm leads to a decrease of aroma compounds in the final beverage. The decrease of aroma at higher diameter occurs at 5000 rpm as well as at 10000 rpm. The highest impact is found for high volatiles at 5000 rpm (28% less), which also comprises many freshness markers like aldehydes and dimethylsulfides. At 10000 rpm, the loss is similar for high and low volatiles and less drastic as at 5000 rpm. Low and medium volatiles were present in 10-20% lower amount for both tested speeds.

| | Relative values for 63 mm diameter force ring vs. 52 mm at two different speeds | | | |
|---|---|---|---|---|
| Ppm/R&G coffee | 52 mm 5000 rpm | 63 mm 5000 rpm | 52 mm 10000 rpm | 63 mm 10000 rpm |
| High volatiles | 100 | 72 | 100 | 87 |
| Medium volatiles | 100 | 88 | 100 | 88 |
| Low volatiles | 100 | 81 | 100 | 90 |

Although the present invention has been described with reference to preferred embodiments thereof, many modifications and alternations may be made by a person having ordinary skill in the art without departing from the scope of this invention which is defined by the appended claims.

The invention is claimed as follows:

1. A method for preparing a beverage, the method comprising:
   introducing liquid from a liquid injecting unit of a beverage production device into a capsule and passing the liquid through a beverage substance in the capsule to form the beverage using centrifugal forces formed by a rotational drive member of the beverage production device driving the capsule in centrifugation;
   the capsule comprising a body comprising a bottom end and an open end spaced apart in an axial direction, an upper wall covering the body at the open end along a direction transverse to the axial direction, an enclosure between the body and the upper wall containing the beverage substance, a rim extending outwardly from the body and including an annular flange portion, and an annular pressure-setting ring extending transversally and axially beyond the annular flange portion of the rim, wherein the annular flange portion of the rim is planar, and the annular pressure-setting ring comprises an annular curl extending from an end of the annular flange portion;
   the annular pressure-setting ring positioned at a radial distance of between 25 mm and 30 mm measured between a first position and a second position in a plane comprising the annular flange portion, wherein the first position is a first intersection of a first center axis of the capsule with the plane, and the second position is selected from the group consisting of (i) an edge of the annular flange portion that connects to the annular pressure-setting ring and (ii) a second intersection of the plane with a second center axis of the annular pressure-setting ring that parallels the first center axis of the capsule;
   the beverage production device comprising a capsule holder holding the capsule at least at the rim during centrifugation and further comprising a spring-biasing valve member;
   engaging the annular pressure-setting ring of the capsule with the spring-biasing valve member when the capsule is inserted and closed within the beverage production device to provide a flow restriction valve that restricts exit of the beverage from the capsule; and
   wherein engaging the annular pressure-setting ring of the capsule with the spring-biasing valve member comprises the annular curl of the annular pressure-setting ring moving the spring-biasing valve member in the axial direction.

2. The method of claim 1, wherein the beverage production device comprises an engagement lid which engages the upper wall of the capsule during closure of the beverage production device, the spring-biasing valve member of the beverage production device is arranged circumferentially relative to the engagement lid, and wherein the method further comprises moving the spring-biasing valve member independently from the engagement lid.

3. The method of claim 1, wherein the capsule holder comprises an annular transversal supporting edge comprising a first inward portion for supporting the annular flange portion and a second outward portion for supporting the annular pressure-setting ring of the capsule, wherein the second outward portion forms a recessed step relative to the first inward portion.

4. The method of claim 1, wherein a diameter of the enclosure of the capsule, measured at a junction between the annular flange portion and the body, is between 45 and 50 mm.

5. The method of claim 1, wherein the beverage production device comprises an engagement lid which engages the upper wall of the capsule during closure of the beverage production device, the spring-biasing valve member of the beverage production device is arranged circumferentially relative to the engagement lid, and wherein the spring-biasing valve member is moveable independently from the engagement lid.

6. The method of claim 1, wherein a back-pressure from the pressure-setting ring during centrifugation is between 0.5 bar and 18 bar.

7. The method of claim 1, wherein a back-pressure from the pressure-setting ring during centrifugation is between 1.5 bar and 13.4 bar.

8. The method of claim 1, wherein a back-pressure from the pressure-setting ring during centrifugation is between 2.7 bar and 8.7 bar.

9. The method of claim 1, wherein the annular pressure-setting ring (i) extends, in the axial direction of the capsule, above a plane defined by an axial cross-section of the annular flange portion for engagement with the spring-biasing valve member of the beverage production device and (ii) extends, in the axial direction of the capsule, below the plane defined by the axial cross-section of the annular flange portion for being received in an annular portion of the capsule holder of the beverage production device.

10. The method of claim 1, wherein a ratio of a distance of the annular pressure-setting ring above a plane defined by an axial cross-section of the annular flange portion to a distance of the annular pressure-setting ring below the plane defined by the axial cross-section of the annular flange portion is between 5:1 and 1:0.5.

11. The method of claim 1, wherein a distance of the annular pressure-setting ring above a plane defined by an axial cross-section of the annular flange portion is between 0.5 and 3 mm.

12. The method of claim 1, wherein a distance of the annular pressure-setting ring below a plane defined by an axial cross-section of the annular flange portion is between 0.1 and 1 mm.

13. The method of claim 1, wherein the annular pressure-setting ring extends, in the axial direction of the capsule, above a plane defined by an axial cross-section of the axial cross-section of the axial cross-section of the annular flange portion by a distance that is longer than a distance the annular pressure-setting ring extends, in the axial direction of the capsule, below the plane defined by the axial cross-section of annular flange portion.

14. The method of claim 1, wherein the beverage is a coffee, and the beverage substance in the capsule comprises roasted coffee grounds.

15. The method of claim 1, wherein the annular curl forms an oval curl oriented with a longer dimension of the oval curl extending substantially in one of the axial direction or the transverse direction.

16. The method of claim 1, wherein the annular pressure-setting ring is made of a plastic, a metal or a laminate thereof.

17. The method of claim 1, wherein the annular pressure-setting ring is made of aluminum or a multi-layer laminate of aluminum and a plastic.

18. The method of claim 1, wherein the annular pressure-setting ring is not hollow.

* * * * *